J. KISOR.
Fruit Gatherers.
No. 136,072.    Patented Feb. 18, 1873.
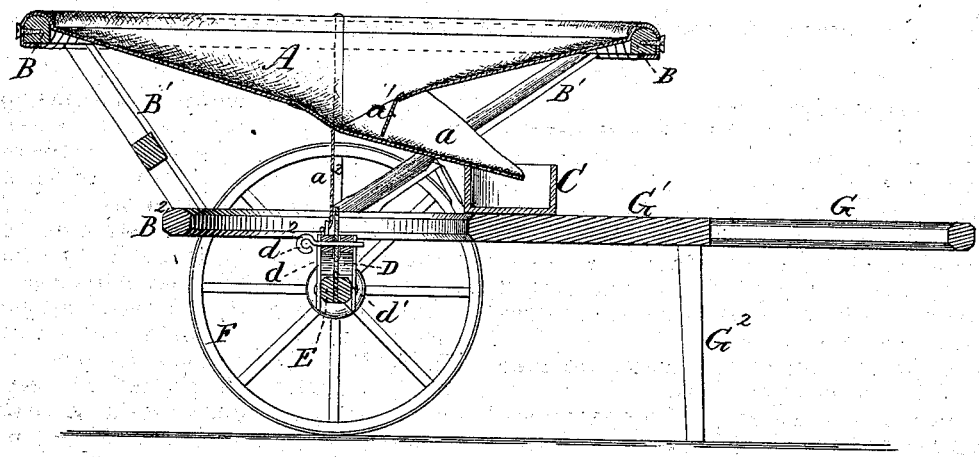
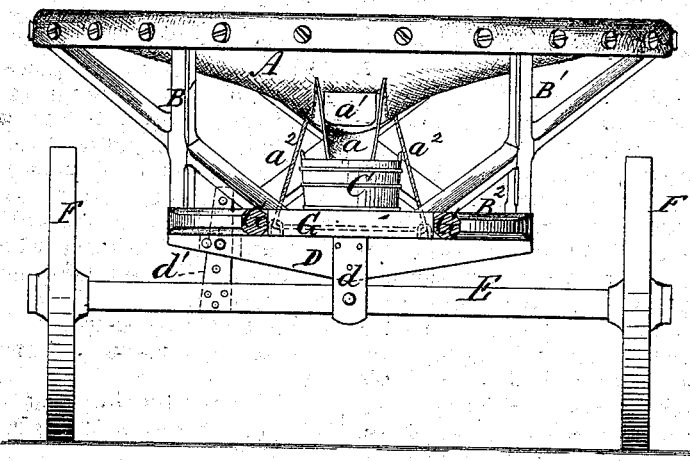

UNITED STATES PATENT OFFICE.

JOHN KISOR, OF NEVADA, OHIO.

IMPROVEMENT IN FRUIT-GATHERERS.

Specification forming part of Letters Patent No. 136,072, dated February 18, 1873.

*To all whom it may concern:*

Be it known that I, JOHN KISOR, residing in Nevada, in the county of Wyandot and State of Ohio, have invented a certain Improvement in Fruit-Gatherers, of which the following is a specification:

In the annexed drawing, Figure 1 represents a front view of my improved machine or fruit-gatherer, and Fig. 2 illustrates a longitudinal vertical section of the same.

Like parts in both of the figures are designated by corresponding letters.

This invention relates to a fruit-gatherer of that class which is placed under the tree and catches or receives the falling fruit as the latter is shaken or the fruit otherwise removed therefrom, and deposits it in a receptacle located contiguously to the mouth of the gatherer; and the nature of this invention consists of a textile apron or receptacle, suitably fastened to or stretched over a frame, the latter being susceptible of being tilted and transported through any required means, substantially as hereinafter more fully set forth and particularly pointed out in the claims.

To enable others to make and use my invention, I will proceed to describe it.

In the accompanying drawing, A refers to the apron or receptacle, which is made from some textile material, whereby the fruit, in falling upon the same, will not be bruised or otherwise damaged. This apron is preferably made circular and stretched over the surface of a cylindrical frame or hoop, B, to which it is fastened, as shown in the drawing, or in any other suitable way. In the center or middle of the surface of the apron A is an opening, around which and connected to the said apron is placed a spout, $a$, which conveys the fruit, after passing through the said opening, to the receptacle C. A valve or door, $a^1$, is hung in the opening or discharge just referred to for the purpose of checking the rapid movement of the fruit, lessening the liability of the latter being bruised in falling or passing from the apron to the receptacle which receives it. To cause the falling fruit to approach and enter the discharge-opening, and at the same time have a tendency to keep it from being ejected from the said apron A in consequence of the force with which it is precipitated upon the latter, the apron is depressed at its center, whereby it is made to assume the shape of an inverted cone, as shown in the drawing, and then connected to the bolster of the frame, upon which its hoop is secured by cords or ropes $a^2$ $a^2$, through which the said apron may be tightened or loosened, as desired. $B^1$ $B^1$ refer to a frame of suitable construction for supporting the hoop or frame B, to which the apron is secured, the lower extremities of the bars constituting the same being suitably fastened to another but smaller hoop or cylinder frame, $B^2$, which is mounted upon a bolster, D. The bolster D is pivoted by means of a clip, $d$, or other suitable means, to an axle, E, supplied with wheels F, so as to permit of the machine, supported thereon, being tilted, whereby the apron may be held in a horizontal position should the ground upon which the machine stands be hilly, uneven, or inclined. A perforated standard or upright, $d^1$, which is fastened to the axle E, is made to pass up through a slot in the bolster D, and receives a key or pin, $d^2$, passing through an aperture in the said bolster, the object of which being to firmly hold the apron in the desired position. To enable the machine to be conveniently handled in moving it from place to place, it is supplied with handles G G. Between and to the rear portions of these handles is secured a board, $G^1$, upon which the receptacle C is placed. To support the said handles and board in a horizontal position while the machine is standing still, a leg, $G^2$, is supplied to the said board.

Having thus described my invention, what I claim, and desire to secure by Letters Patent, is—

1. The combination, with the apron A $a^1$ of a fruit-gatherer, of the valve $a^1$, substantially as specified.

2. The adjustable pivoted bolster D, in combination with the axle E and a frame for supporting the apron A, substantially as shown and described.

3. The combination of the adjustable pivoted bolster D, axle E, frame B $B^1$ $B^2$, apron A, and platform G, substantially as specified.

In testimony whereof I have hereunto signed my name this 22d day of August, A. D. 1872, in presence of two subscribing witnesses.

JOHN KISOR.

Witnesses:
D. A. KUHN,
CYRUS McCAULET.